Feb. 1, 1966 K. STÖCKEL 3,232,048
ROCKET ENGINE
Filed Dec. 2, 1960 3 Sheets-Sheet 1

INVENTOR
Karl Stöckel

Feb. 1, 1966 K. STÖCKEL 3,232,048
ROCKET ENGINE
Filed Dec. 2, 1960 3 Sheets-Sheet 2

INVENTOR
Karl Stöckel

Feb. 1, 1966 K. STÖCKEL 3,232,048
ROCKET ENGINE
Filed Dec. 2, 1960 3 Sheets-Sheet 3

INVENTOR
Karl Stöckel

United States Patent Office 3,232,048
Patented Feb. 1, 1966

3,232,048
ROCKET ENGINE
Karl Stöckel, Ottobrunn, near Munich, Germany, assignor to Bolkow Gesellschaft mit Beschrankter Haftung, Ottobrunn, near Munich, Germany
Filed Dec. 2, 1960, Ser. No. 73,453
Claims priority, application Germany, Dec. 12, 1959, St. 15,893
11 Claims. (Cl. 60—35.6)

This invention relates to liquid-propellant rocket engines in which the propellant pumps are driven by a turbine.

It is known how to construct rocket engines characterized in that the oxygen pump is driven by a turbine which divides the combustion chamber into a pre-combustion chamber and a final combustion chamber. After passing through the pump and before entering the combustion chamber, the oxygen-supplying liquid, e.g. liquid oxygen, hereinafter briefly denoted as oxygen, is fed through a tube system in the wall of the nozzle and the combustion chamber and is thus preheated. Owing to this arrangement reliable operation with high efficiency is obtained.

It is generally known that coolants are used which, after leaving the combustion chamber wall, react with the propellant in the combustion chamber.

In the case of a known engine, in which the burning gases expand from an annular pre-combustion chamber through a turbine into a final combustion chamber, all propellant pumps are arranged on the turbine rotor.

In order to realize a simple engine having as small a number of moving parts as possible, the present invention exceeds this idea.

It is the object of the invention to provide an improved rocket engine which is simple in construction and reliable in operation.

It is another object of the invention to provide a rocket engine with improved pump systems for the fluids which are necessary for the combustion or for cooling different parts of the engine.

It is still another object of the invention to provide a rocket engine with improved pump systems arranged on a turbine rotor.

It is a further object of the invention to provide a rocket engine having an annular pre-combustion chamber, a final combustion chamber and a turbine rotor arranged between the pre-combustion chamber and the final combustion chamber, which turbine rotor is driven by the combustion gases flowing from the pre-combustion chamber into the final combustion chamber and which turbine rotor comprises at least one pump system for pumping one fluid necessary for the combustion or for cooling the different parts.

It is another object of the invention to provide a rocket engine having a pre-combustion chamber and a final combustion chamber, at least the final combustion chamber having cooling ducts adjacent to its walls, having a turbine rotor arranged between the pre-combustion chamber and the final combustion chamber, said turbine rotor comprising at least one pump system for a cooling medium which is fed to said cooling ducts.

It is another object of the invention to provide a rocket engine having a hollow casing and a nozzle, a pre-combustion chamber in the hollow casing, a final combustion chamber in the nozzle, a turbine rotor arranged on a shaft, a bearing for the shaft arranged in the casing, said turbine rotor comprising pump systems for the fluids necessary for the combustion, whereby said bearing has to seal the shaft only against the inlet pressures of the pump systems of the turbine rotor, which inlet pressures may be held near atmospheric pressure.

According to the invention the turbine and the propellant pumps of an engine of the above-described type are arranged on a common rotor. In this case a propellant component, preferably the fuel oil, is used for cooling the rotor blades of the turbine, while another propellant component is fed into the wall of the nozzle and of the combustion chamber for cooling purposes and is then ducted into the combustion chamber through the hollow stator blades.

In a preferred realisation of the invention the propellant consists of three components: fuel oil, oxygen, and water. In this case the water serves for cooling the wall of the combustion chamber and of the nozzle, while the fuel oil is used for cooling the rotor blades. All three components are fed into the pre-combustion chamber and participate in the combustion, while part of the fuel oil, which is fed through the rotor blades for cooling purposes, is injected into the final combustion chamber and serves for maintaining the additional combustion. To cool the rotor blades of the turbine, oxygen or a partial stream of the cooling water can be used, too.

From the realisation according to this invention there result the following advantages as compared to known rocket engines:

The combination of the propellant pumps and of the turbine means a considerable reduction of the mass of the rotating parts. The rotor which contains the pumps and the turbine is the only moving part of the engine. As the rotor is fitted outside the combustion chambers, it is not necessary to provide a packing against engine pressure at the shaft, and moreover a constant low bearing temperature can be realized, wherefrom result very small losses due to tightening and friction. This contributes considerably to the reliability of operation.

Owing to the already mentioned operation with three fluids, i.e. water, fuel oil, and oxygen, the effective propellant consumption is reduced considerably. Furthermore, there result favourable cooling conditions and therewith a reliable economic operation.

The combustible gases leave the turbine and enter the final combustion chamber obliquely to the turbine axis. A less hot zone at the centre and therewith favourable thermal conditions at the turbine cover plate are thus achieved. The oblique flow through the final combustion chamber along the conical wall of the combustion chamber is largely laminar, and hence a uniform heat transfer at the wall of the combustion chamber can be achieved.

The oil injection from the rotating nozzles of the rotor and the admixture of the coolant in the pre-combustion chamber is influenced by an annular, fixed flame-holder. Reliable ignition and heating of the propellant can thus be achieved even with a small pre-combustion chamber.

The wall of the combustion chamber is cooled in such a way that one part of the coolant is injected into the final combustion chamber for final combustion, while the other part is injected into the pre-combustion chamber through the rotor blades via the cooling ducts in the engine and through the stator blades. An optimum cooling of the combustion chamber casing can be obtained by balancing the two partial flows.

Two examples of application of the invention are described in the following and shown in the drawings:

FIG. 2 is an enlarged partial section of FIG. 1,

Figure 6:
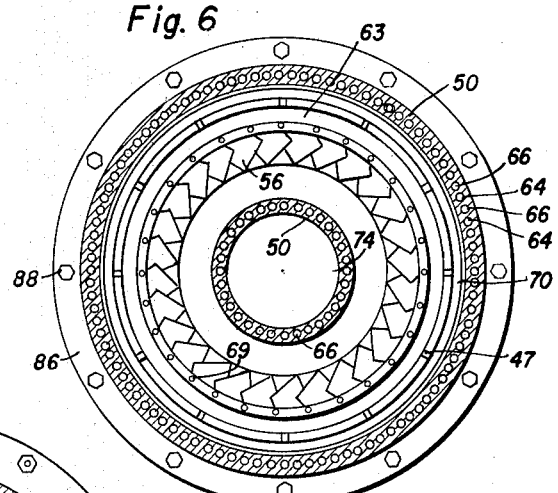
Figure 7:
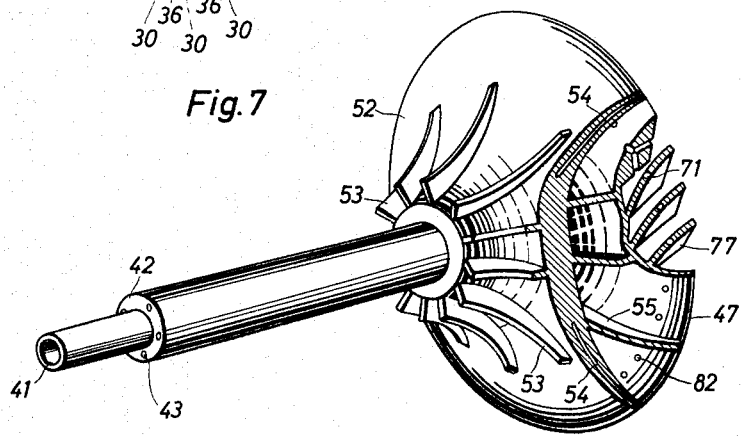
Figures 4, 5, 8:
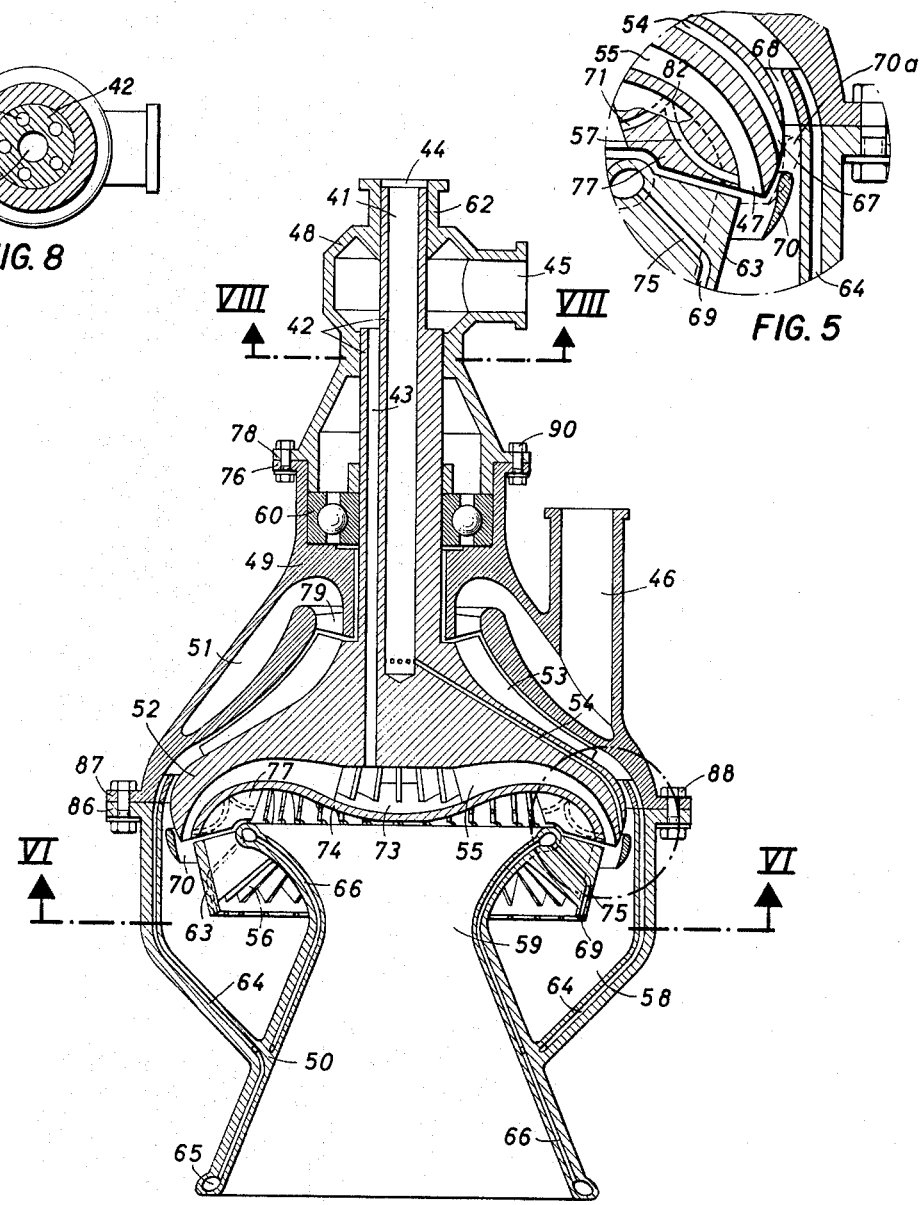

FIG. 4 is a longitudinal section of an engine for three-component fluid operation, FIG. 5 is an enlarged partial section of FIG. 2 according to the circular segment, but in the plane denoted by V in FIG. 8, FIG. 6 is a cross-section of the version of FIG. 4 along the line VI—VI, FIG. 7 is an oblique view of the turbine rotor of the version of FIG. 4, FIG. 8 is another cross-section of FIG. 4 along the line VIII—VIII.

Figure 1:
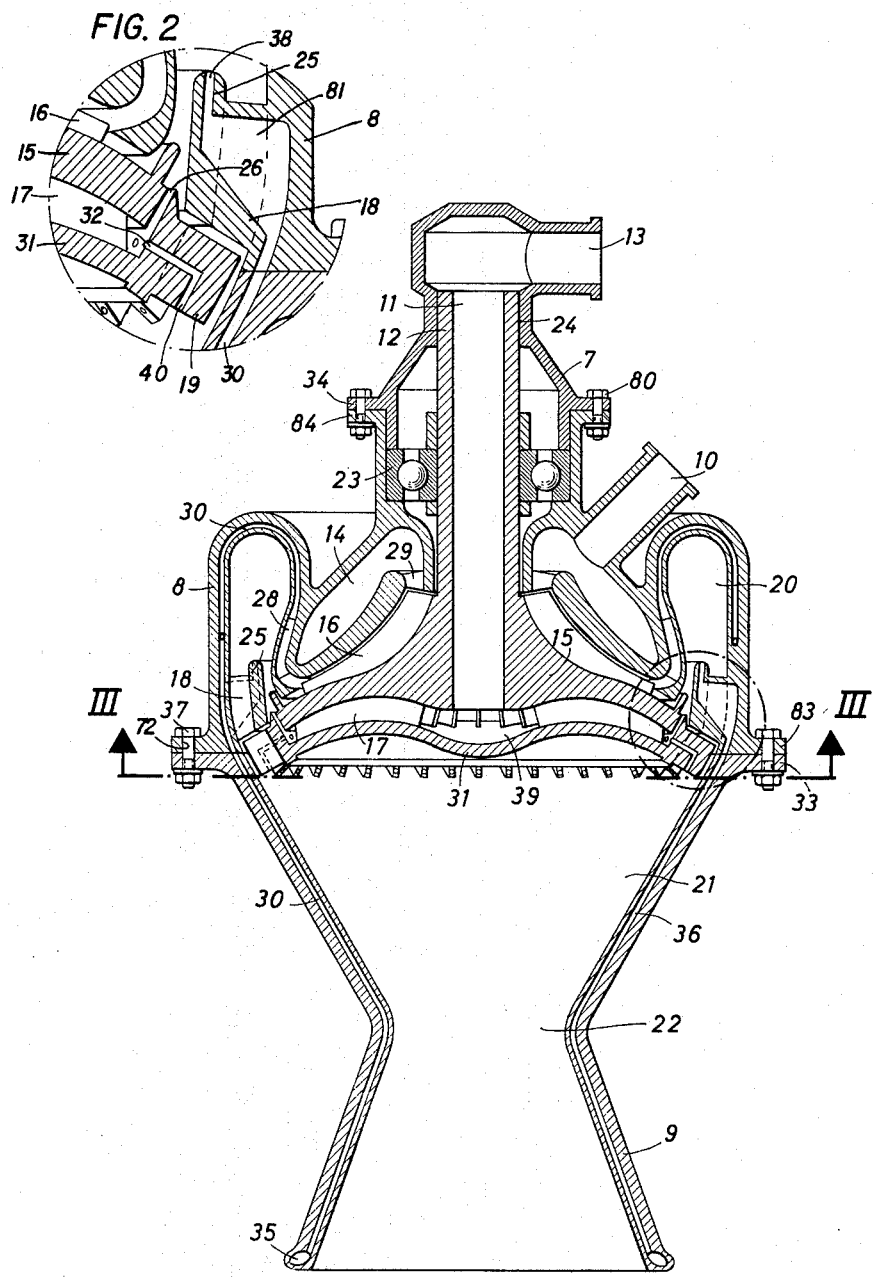
FIG. 1 is a longitudinal section of an engine.
Figure 3:
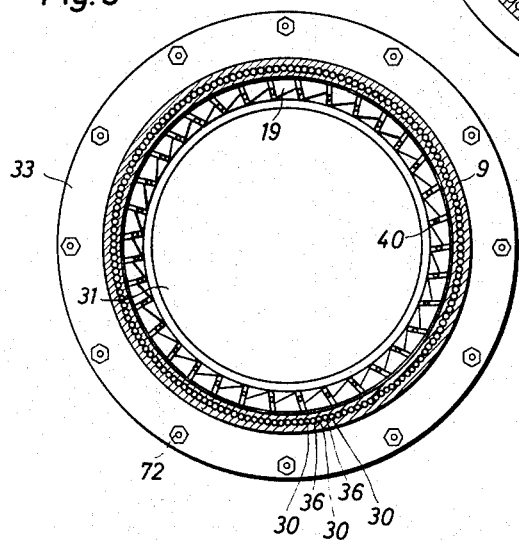
FIG. 3 is a cross-section through the engine of FIG. 1 along the line III—III.

The engine of FIGS. 1 to 3 has a turbine rotor 15 having turbine blades 19 with cavities 32 terminating in nozzles 40 in the trailing edges of the blades 19.

The turbine has been designed as an axial turbine with oblique flow. A pump 16, which feeds the liquid oxygen, and a pump 17, which feeds the fuel oil, are mounted onto turbine rotor 15. Said turbine rotor 15 is suspended in overhung position on a turbine shaft 12, i.e. outside the two bearings of the shaft. The turbine shaft 12 is mounted in the casing with main bearing 23 and with auxiliary bearing 24, which simultaneously form a sealing against the propellant entering at 13. Said casing consists of three parts 7, 8 and 9 being connected at flanges 33, 83 and 34, 84 by screws 37 and 80. The flange connections are sealed against the internal pressure. Forward part 7 of the casing, in which rests auxiliary bearing 24, also carries entrance 13 for the fuel oil. Central part 8 of the casing, in which is mounted main bearing 23, carries oxygen inlet pipe 10, and together with its annular duct 14, through which oxygen is supplied into oxygen pump 16 via stator 29, as well as with pre-combustion chamber 20 it forms the casing for turbine rotor 15. Rear part 9 of the casing forms the outer wall for final combustion chamber 21 and thrust nozzle 22, the forward part of the latter forming the final combustion chamber. Part 7 of the casing with flange 34 is connected to flange 84 of part 8 of the casing by means of screws 80. Flanges 34 and 84 are sealed against each other. Part 8 of the casing is connected to part 9 of the casing at flanges 83 and 33 by means of screws 37 sitting in bores 72'. The two parts 8 and 9 are provided with respectively coordinated cooling ducts 30 being equally distributed along the circumference and connected with oxygen pump 16 through oxygen distributor 28. Flange connection 33–83 has been designed in such a way that cooling ducts 30 and 36 are sealed in parts 8 and 9 of the casing. The ends of cooling ducts 30 are interconnected through annular duct or manifold 35. Return pipes 36 lead from there to cavities 81 in turbine stator blades 18, which carry the annular flame-holder 25 and are connected to bores 38 in the wall of the flame-holder.

The fuel oil is fed through entrance 13 and bore 11 in turbine shaft 12 through which it enters chamber 39 under turbine cover plate 31. One part of the fuel oil is injected into pre-combustion chamber 20 through nozzle 26 (FIG. 2) by means of fuel oil pump 17, while the other part is injected into final combustion chamber 21 through nozzles 40 in turbine blades 19. The oxygen needed for combustion is sucked in through inlet tube 10 in annular duct 14 and is partly fed through nozzle slot 27 into pre-combustion chamber 20 by means of oxygen pump 29, 16. The main quantity of oxygen, however, flows from pump 16 through distributor 28 into cooling ducts 30 in the wall of the combustion chamber. After flowing through these cooling ducts up to annular duct 35 and back through return pipe 36 into cavities 81 (FIG. 2) in the stator blades 18, the oxygen is introduced into pre-combustion chamber 20 through bore 38 in annular flame-holder 25. Hence fuel oil and oxygen are injected into pre-combustion chamber 20 in the same direction. I have a continuous combustion which supplies the gases required for operating turbine 19 arranged behind the pre-combustion chamber. Combustion takes place with excess of oxygen. The gases are conducted through the spaces between turbine stator blades 18 (FIG. 2) to turbine rotor blades 19. Part of the fuel oil which flows through the ducts 32 in the rotor blades 19, thus cooling the blades, is injected into the final combustion chamber through nozzles 40. Said injection as well as the flow through turbine rotor 19 are oblique to the turbine axis in the direction of casing wall 9. The final combustion taking place in this section produces that quantity of gas which flows through thrust nozzle 22 at an increased velocity.

FIG. 4 shows a version in which three different fluids for operating the turbine are fed into the combustion chamber and mixed. The engine casing consists of three parts 48, 49, 50, the parts 48 and 49 being connected at flanges 76 and 78 by screws 90 and the parts 49 and 50 being connected at flanges 86 and 87 by screws 88. Forward part 48 carries inlet pipe 44 for fuel oil, inlet pipe 45 for oxygen-supplying liquid, and auxiliary bearings 61 and 62 for turbine shaft 42. Main bearing 60 of turbine shaft 42 is fitted in the following part 49 with inlet pipe 46 for cooling water. Said part 49 simultaneously forms the casing for turbine rotor 52. Rear part 50 houses pre-combustion chamber 58 and nozzle 59, in the forward convergent part of which final combustion takes place. To cool combustion chamber jacket 50, said jacket has been provided with axial cooling ducts 64, which run into annular duct 65 at the end of thrust nozzle 59 from where return ducts 66 lead up to turbine stator 56 carrying flame-holder 63 and are connected to cavities 75 (FIG. 5) in stator blades 56 and in flame-holder 63.

A slot 68 is fitted in the feed line to the cooling ducts for direct injection into pre-combustion chamber 58. To adjust the cooling system an axially movable setting ring 70 (FIG. 5) is fitted adjacent to said slot for the coolant. Said ring is brought into the respective position before assembly. Besides centrifugal pump 53 for the cooling water and centrifugal pump 55 for the oxygen-supplying liquid, turbine rotor 52, which is fixed on shaft 42, carries bores 54 in about radial direction serving for feeding the fuel oil. Turbine shaft 42 is suspended in main bearing 60 as well as in auxiliary bearings 61 and 62. Said shaft has an internal bore 41 for feeding fuel oil as well as outer bores 43 for feeding oxygen-supplying liquid which can be seen particularly in FIG. 7.

The fuel oil entering through opening 44 is sucked through internal bore 41 into radial ducts 54 of turbine rotor 52 and compressed to combustion chamber pressure, said radial ducts 54 acting as centrifugal pumps. The fuel oil is injected into pre-combustion chamber 58 through fuel oil nozzle 67.

The oxygen-supplying liquid, e.g. liquid oxygen, is sucked in through opening 45 and flows through outer ducts 43 of turbine shaft 42 into collecting chamber 73 under cover plate 74 of oxygen pump 55. From here it is fed by pump blades 55 and blown out of nozzles 47 into pre-combustion chamber 58. It then flows along flame-holder 63 where part of the fuel oil corresponding to the oxygen and leaving nozzles 67 is burned. Centrifugal pump 55 for the oxygen is designed in such a way that part of the oxygen is fed through bores 57 and 71 (FIG. 5) having a common mouth 82 toward the oxygen pump in blades 77 of the turbine being mounted on the same rotor, whereby blades 77 are cooled.

The water serving for direct cooling of the combustion and for indirect cooling is sucked into annular chamber 51 through tube 46 and fed into cooling ducts 64 through pump 53, while part of the water enters pre-combustion chamber 58 through slot 68. The main portion of the cooling water flows through cooling ducts 64, 65, 66 in the wall of the combustion chamber and of the nozzle into cavities 75 in blades 56 of the turbine stator from which it is injected into pre-combustion chamber 58 through injection nozzle 69 in annular flame-holder 63. By axially shifting setting ring 70 the cooling of the combustion chamber is controlled, which can be seen in FIG. 5. By shifting the setting ring into position 70a, the direct entry of water can be reduced so that most of the cooling water flows through the wall of the combustion chamber, while an increasing water quantity directly flows into pre-combustion chamber 58 when shifting setting ring 70 inversely. The adjustment is done before the assembly. The burning gases being produced in the pre-combustion chamber flow through stator 56 and through rotor blades 77 of the turbine. When the gases leave the turbine a laterally branched-off partial flow of the oxygen is injected from oxygen pump 55 through injection nozzles at the ends of bores 71 so that the residual fuel oil burns in the converging part of thrust nozzle 59.

The injection of oxygen into the final combustion chamber in the case of pre-combustion with excess fuel oil is worth while only when propellants are used whose mixture ratio required for complete combustion is about 1:1, as for instance for the combustion of hydrazine. Otherwise the combustion with excess oxygen will take place in pre-combustion chamber 51, while fuel oil is injected from nozzles 71 in turbine blades 77.

I claim:

1. A rocket engine comprising a hollow casing, a stationary pre-combustion chamber integral with said casing, a nozzle defining a final combustion chamber being in communication with said pre-combustion chamber and having a discharge opening for exhaust gases, said nozzle being connected to said casing, cooling ducts adjacent to said nozzle and extending substantially along said nozzle, a coolant manifold in said casing adjacent to said discharge opening of said nozzle for establishing communication between said cooling ducts, a shaft rotatably mounted in said casing, a hollow turbine rotor on said shaft, said turbine rotor being arranged between said pre-combustion chamber and said final combustion chamber and having rotor blades, whereby said turbine rotor is driven by the combustion gases flowing from the pre-combustion chamber into the final combustion chamber, said turbine rotor comprising at least two centrifugal pump systems for pumping at least two fluids into said pre-combustion chamber for burning said fluids, means for supplying said fluids to the inlet openings of the pump systems, certain of said cooling ducts being connected to the outlet openings of at least one pump system at the end of said ducts opposite said manifold, the remaining cooling ducts being in communication with the pre-combustion chamber, whereby the fluid pumped by said system is first forced through certain of said cooling ducts in the direction of said discharge opening and then back through certain other of said cooling ducts to said pre-combustion chamber for cooling said nozzle.

2. The rocket engine of claim 1 in which part of one of said fluids is directly pumped into the final combustion chamber by means of the respective pump system of the turbine rotor, while the other part of the fluid is pumped into the pre-combustion chamber.

3. The rocket engine of claim 1 wherein said nozzle has inner and outer walls in which the walls of said pre-combustion chamber are formed partly by said casing and partly by the outer walls of said nozzle.

4. The rocket engine of claim 1 in which additional cooling ducts are arranged adjacent to the walls of said casing in the region of said precombustion chamber, said additional cooling ducts being connected to at least some cooling ducts of the nozzle, whereby the fluid which flows through the cooling ducts of the nozzle also flows at least partly through the additional cooling ducts for cooling the pre-combustion chamber.

5. The rocket engine of claim 1 including stator blades adjacent said rotor in which annular flame-holders are arranged on said stator blades, the fluids fed by the centrifugal pump systems being sprayed against said flame-holders, passages in said stator blades and flame-holders being in communication with the cooling ducts of the nozzle on the one hand and with the pre-combustion chamber on the other hand.

6. The rocket engine of claim 1 in which the turbine rotor has a conical periphery onto which are mounted said rotor blades, said nozzle having a conical inner surface in the range of the final combustion chamber adjacent to said turbine rotor, the cone angle of said inner surface being equal to that of the conical periphery carrying the rotor blades.

7. A rocket engine comprising a hollow casing, a stationary pre-combustion chamber being integral with said casing, a nozzle defining a final combustion chamber being in communication with said pre-combustion chamber and having a discharge opening for exhaust gases, cooling ducts adjacent to said nozzle and extending substantially along said nozzle, means positioned adjacent to said discharge opening of said nozzle for establishing communication between pre-determined cooling ducts, a shaft rotatably mounted in said casing, a hollow turbine rotor on said shaft, said turbine rotor being arranged between pre-combustion chamber and said final combustion chamber and having rotor blades, whereby said turbine rotor is driven by the combustion gases flowing from the pre-combustion chamber into the final combustion chamber, said turbine rotor defining three centrifugal pump systems for pumping three fluids into said combustion chambers for burning partly at least one of said fluids, means for supplying said fluids to the inlet openings of the pump systems, some of said cooling ducts being connected to the outlet openings of one pump system, the remaining cooling ducts being in communication with the pre-combustion chamber, whereby the fluid pumped by said system is first forced through said cooling ducts in the direction of said discharge opening and then back through said ducts to said pre-combustion chamber for cooling said nozzle.

8. A rocket engine comprising a hollow casing, a stationary pre-combustion chamber being integral with said casing, a nozzle defining a final combustion chamber being in communication with said pre-combustion chamber and having a discharge opening for exhaust gases, cooling ducts adjacent to said nozzle and extending substantially along said nozzle, means positioned adjacent to said discharge opening of said nozzle for establishing communication between pre-determined cooling ducts, a shaft rotatably mounted in said casing, a hollow turbine rotor on said shaft, said turbine rotor being arranged between said pre-combustion chamber and said final combustion chamber and having rotor blades, whereby said turbine rotor is driven by the combustion gases flowing from the pre-combustion chamber into the final combustion chamber, said turbine rotor defining three centrifugal pump systems for pumping three fluids, namely a fuel oil, an oxygen-supplying medium and water, into said pre-combustion chamber for burning at least partly said fuel oil, means for supplying said fuel oil, said oxygen-supplying medium and said water to the respective inlet openings of the pump systems, some of said cooling ducts being in communication with the outlet openings of one pump system, the remaining cooling ducts being connected to the pre-combustion chamber, whereby the fluid pumped by said system is first forced through said cooling ducts in the direction of said discharge opening and then back through said cooling ducts to said pre-combustion chamber for cooling said nozzle.

9. A rocket engine comprising a hollow casing, a stationary pre-combustion chamber being integral with said casing, a nozzle defining a final combustion chamber being in communication with said pre-combustion chamber and having a discharge opening for exhaust gases, cooling ducts adjacent to said nozzle and extending substantially along said nozzle, means positioned adjacent to said discharge opening of said nozzle for establishing communication between pre-determined cooling ducts, a shaft rotatably mounted in said casing, a hollow turbine rotor on said shaft, said turbine rotor being arranged between pre-combustion chamber and final combustion chamber and having rotor blades, whereby said turbine rotor is driven by the combustion gases flowing from the pre-combustion chamber into the final combustion chamber, said turbine rotor defining three centrifugal pump systems for pumping three fluids, namely, a fuel oil, an oxygen-supplying medium and water, into said pre-combustion chamber for burning at least partly said fuel oil, means for supplying said fuel oil, said oxygen-supplying medium and said water to the respective inlet openings of the pump systems, some of said cooling ducts being in communication with the outlet openings of the water pump system, the remaining cooling ducts being connected to the pre-combustion chamber, whereby the water pumped by said system is first forced through said cooling ducts in the direction of said discharge opening and then back through said cooling ducts to said pre-combustion chamber for cooling said nozzle, the turbine rotor and the casing forming an annular slot adjacent to the outlet opening of the water pump system, said annular slot being in communication with the pre-combustion chamber, whereby part of the water pumped by the pumping system is fed into the pre-combustion chamber.

10. The rocket engine of claim 9 in which an axially shiftable ring is disposed in the pre-combustion chamber adjacent to said annular slot, whereby the rate of the water, which is fed into the pre-combustion chamber, is controlled by shifting said ring.

11. The rocket engine of claim 8 in which said turbine rotor blades have first cooling ducts, which are in communication with one of the centrifugal pump systems of the turbine rotor and with the final combustion chamber, respectively, and have second cooling ducts, which are in communication with said centrifugal pump system of the turbine rotor and lead from the mouth of the first cooling duct opening into said centrifugal pump system to a point downstream of said mouth.

References Cited by the Examiner

UNITED STATES PATENTS

| | | | |
|---|---|---|---|
| 2,558,483 | 6/1951 | Goddard | 60—35.6 |
| 2,883,828 | 4/1959 | Howell | 60—35.6 |
| 2,926,490 | 3/1960 | Eaton et al. | 60—35.6 |
| 2,937,491 | 5/1960 | Howell | 60—35.6 |
| 2,977,754 | 4/1961 | Bell | 60—35.6 |
| 3,036,428 | 5/1962 | Chillson | 60—35.6 |

FOREIGN PATENTS

| | | |
|---|---|---|
| 702,779 | 1/1954 | Great Britain. |
| 771,896 | 4/1957 | Great Britain. |

MARK NEWMAN, *Primary Examiner.*

SAMUEL FEINBERG, *Examiner.*

V. R. PENDEGRASS, *Assistant Examiner.*